(12) United States Patent
Hu et al.

(10) Patent No.: US 11,823,471 B2
(45) Date of Patent: Nov. 21, 2023

(54) TEXT RECOGNITION IN IMAGE

(71) Applicant: Microsoft Technology Licensing, LLC, Redmond, WA (US)

(72) Inventors: Wenping Hu, Redmond, WA (US); Qiang Huo, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/795,446

(22) PCT Filed: Jan. 20, 2021

(86) PCT No.: PCT/IB2021/000032
§ 371 (c)(1),
(2) Date: Jul. 26, 2022

(87) PCT Pub. No.: WO2021/161095
PCT Pub. Date: Aug. 19, 2021

(65) Prior Publication Data
US 2023/0064122 A1    Mar. 2, 2023

(30) Foreign Application Priority Data
Feb. 14, 2020    (CN) .......................... 202010093899.1

(51) Int. Cl.
*G06V 30/14*    (2022.01)
*G06V 30/19*    (2022.01)
(Continued)

(52) U.S. Cl.
CPC .......... *G06V 20/63* (2022.01); *G06V 30/1444* (2022.01); *G06V 30/19147* (2022.01);
(Continued)

(58) Field of Classification Search
CPC ............... G06V 20/63; G06V 30/1444; G06V 30/19147; G06V 30/293; G06V 30/287; G06V 30/10
See application file for complete search history.

(56) References Cited

U.S. PATENT DOCUMENTS 8,442,813 B1 * 5/2013 Popat .................... G06V 30/268
704/9
9,785,867 B2 * 10/2017 Hamada ................ G06F 40/205
(Continued)

FOREIGN PATENT DOCUMENTS

| CN | 101751567 A | 6/2010 |
| CN | 102012748 A | 4/2011 |

(Continued)

OTHER PUBLICATIONS

"OCR Language Support", Retrieved From: https://web.archive.org/web/20190608132331/https:/cloud.google.com/vision/docs/languages, Jun. 8, 2019, 2 Pages.
(Continued)

*Primary Examiner* — Gregory M Desire
(74) *Attorney, Agent, or Firm* — Schwegman Lundberg & Woessner, P.A.

(57) ABSTRACT

According to implementations of the subject matter described herein, there is provided a solution for text recognition in an image. In this solution, a target text line area, which is expected to include a text to be recognized, is determined from an image. Probability distribution information of a character model element(s) present in the target text line area is determined using a single character model. The single character model is trained based on training text line areas and respective ground-truth texts in the training text line areas. Texts in the training text line areas are arranged in different orientations, and/or the ground-truth texts comprise texts are related to various languages (e.g.,
(Continued)

texts related to a Latin and an Eastern languages). The text in the target text line area can be determined based on the determined probability distribution information. The single character model enables more efficient and convenient text recognition.

19 Claims, 6 Drawing Sheets

(51) Int. Cl.
  *G06V 30/28* (2022.01)
  *G06V 20/62* (2022.01)
  *G06V 30/10* (2022.01)
(52) U.S. Cl.
  CPC .......... *G06V 30/287* (2022.01); *G06V 30/293* (2022.01); *G06V 30/10* (2022.01)

(56) References Cited

U.S. PATENT DOCUMENTS

| | | | |
|---|---|---|---|
| 9,798,943 | B2 | 10/2017 | Collet et al. |
| 10,043,231 | B2 * | 8/2018 | Osindero ................ G06T 1/20 |
| 10,372,821 | B2 * | 8/2019 | Chang ................ G06F 40/114 |
| 11,328,524 | B2 * | 5/2022 | Cristescu ............ G06V 30/414 |
| 11,386,682 | B2 * | 7/2022 | Collet ................ G06V 30/414 |
| 2019/0087677 | A1 | 3/2019 | Wolf et al. |

FOREIGN PATENT DOCUMENTS

| | | |
|---|---|---|
| CN | 106528535 A | 3/2017 |
| CN | 109902622 A | 6/2019 |

OTHER PUBLICATIONS

Cai, Meng, et al., "Compact and Efficient WFST-based Decoders for Handwriting Recognition", In Proceedings of 14th IAPR International Conference on Document Analysis and Recognition, Nov. 9, 2017, pp. 143-148.

Bartz, Christian, et al., "STN-OCR: A single Neural Network for Text Detection and Text Recognition", In Repository of arXiv:1707.08831v1, Jul. 27, 2017, 9 Pages.

Horev, Rani, "XLM—Enhancing BERT for Cross-lingual Language Model", Retrieved From: https:// towardsdatascience.com/xlm-enhancing-bert-for-cross-lingual-language-model-5aeed9e6f14b, Feb. 12, 2019, 6 Pages.

Jaderberg, Max, et al., "Reading Text in the Wild with Convolutional Neural Networks", In International Journal of Computer Vision, vol. 116, Issue 1, 2016, 1-20.

Khosla, Nitan, et al., "Rotation, Scale and Font Invariant Character Recognition System using Neural Networks", In International Journal of Advanced Research in Computer Engineering & Technology, vol. 3, Issue 9, Sep. 1, 2014, pp. 3138-3142.

Llobet, Rafael, et al., "OCR Post-processing Using Weighted Finite-State Transducers", In Proceedings of the 20th International Conference on Pattern Recognition, Aug. 23, 2010, pp. 2021-2024.

"International Search Report and Written Opinion Issued in PCT Application No. PCT/IB21/000032", dated Jul. 23, 2021, 12 Pages.

Swaileh, Wassim, et al., "A Unified Multilingual Handwriting Recognition System using Multigrams Sub-lexical Units", In Repository of arXiv:1808.09183v1, Aug. 28, 2018, 17 Pages.

Wang, Kai, et al., "High Performance Chinese/English Mixed OCR with Character Level Language Identification", In Proceedings of the 10th International Conference on Document Analysis and Recognition, Jul. 26, 2009, pp. 406-410.

* cited by examiner

TEXT RECOGNITION IN IMAGE

CROSS-REFERENCE TO RELATED APPLICATION

This application is a U.S. National Stage Filing under 35 U.S.C. 371 of International Patent Application Serial No. PCT/IB2021/000032, filed Jan. 20, 2021, and published as WO 2021/161095 A1 on Aug. 19, 2021, which claims priority to Chinese Application No. 202010093899.1, filed Feb. 14, 2020, which applications and publication are incorporated herein by reference in their entirety.

BACKGROUND

Text recognition refers to recognizing a text from an image. Words in the text of the image may be formatted as printed, handwritten, and ink words, or the like. The image including the text may be a digital image captured by an electronic device, a scanned version of a document, an ink-rendered text image, and any other image including the text. The text recognition from the image has various applications, including, for example, digitizing handwritten characters, recognizing desired information such as a license plate number or credential information from the captured image, digitalizing a scanned document, using for image-based information retrieval, using for an ink recognition system, and the like. Many text recognition techniques have been proposed. However, due to the diversity of text forms presented in images, it is desired to provide a more optimized solution for text recognition.

SUMMARY

According to implementations of the subject matter described herein, there is provided a solution for text recognition in an image. In this solution, a target text line area, which is expected to include a text to be recognized, is determined from an image. Probability distribution information of at least one character model element present in the target text line area is determined using a single character model. The single character model is trained based on the following: a plurality of training text line areas, and respective ground-truth texts in the plurality of training text line areas. Texts in the plurality of training text line areas are arranged in different orientations, and/or the ground-truth texts comprise texts related to a plurality of languages (e.g., texts related to a Latin language and an Eastern language). The text in the target text line area may be determined based on the determined probability distribution information. Through this solution, there is no need to train various character models for different text orientations and/or different languages. The use of the single character model enables more efficient and convenient text recognition, without a need to determine the text orientations and/or languages in the target text line area during the text recognition.

The Summary is to introduce a selection of concepts in a simplified form that are further described below in the Detailed Description. The Summary is not intended to identify key features or essential features of the subject matter described herein, nor is it intended to be used to limit the scope of the subject matter described herein.

BRIEF DESCRIPTION OF THE DRAWINGS

Throughout the drawings, the same or similar reference symbols refer to the same or similar elements.

DETAILED DESCRIPTION OF EMBODIMENTS

Principles of the subject matter described herein will now be described with reference to some example implementations. It is to be understood that these implementations are described only for the purpose of illustration and help those skilled in the art to better understand and thus implement the subject matter described herein, without suggesting any limitations to the scope of the subject matter disclosed herein.

As used herein, the term "includes" and its variants are to be read as open terms that mean "includes, but is not limited to." The term "based on" is to be read as "based at least in part on." The terms "an implementation" and "one implementation" are to be read as "at least one implementation." The term "another implementation" is to be read as "at least one other implementation." The term "first," "second," and the like may refer to different or the same objects. Other definitions, either explicit or implicit, may be included below.

As used herein, the term "machine learning model" may also be referred to as a "learning model", "learning network", "network model," or "model". A "neural network" or "neural network model" is a deep machine learning model. A parameter set of the machine learning model is determined through training. The machine learning model maps a received input to a corresponding output using the training parameter set. Therefore, the training process of the machine learning model may be considered as learning from the training data a mapping or association between the input and the output.

Figure 1:
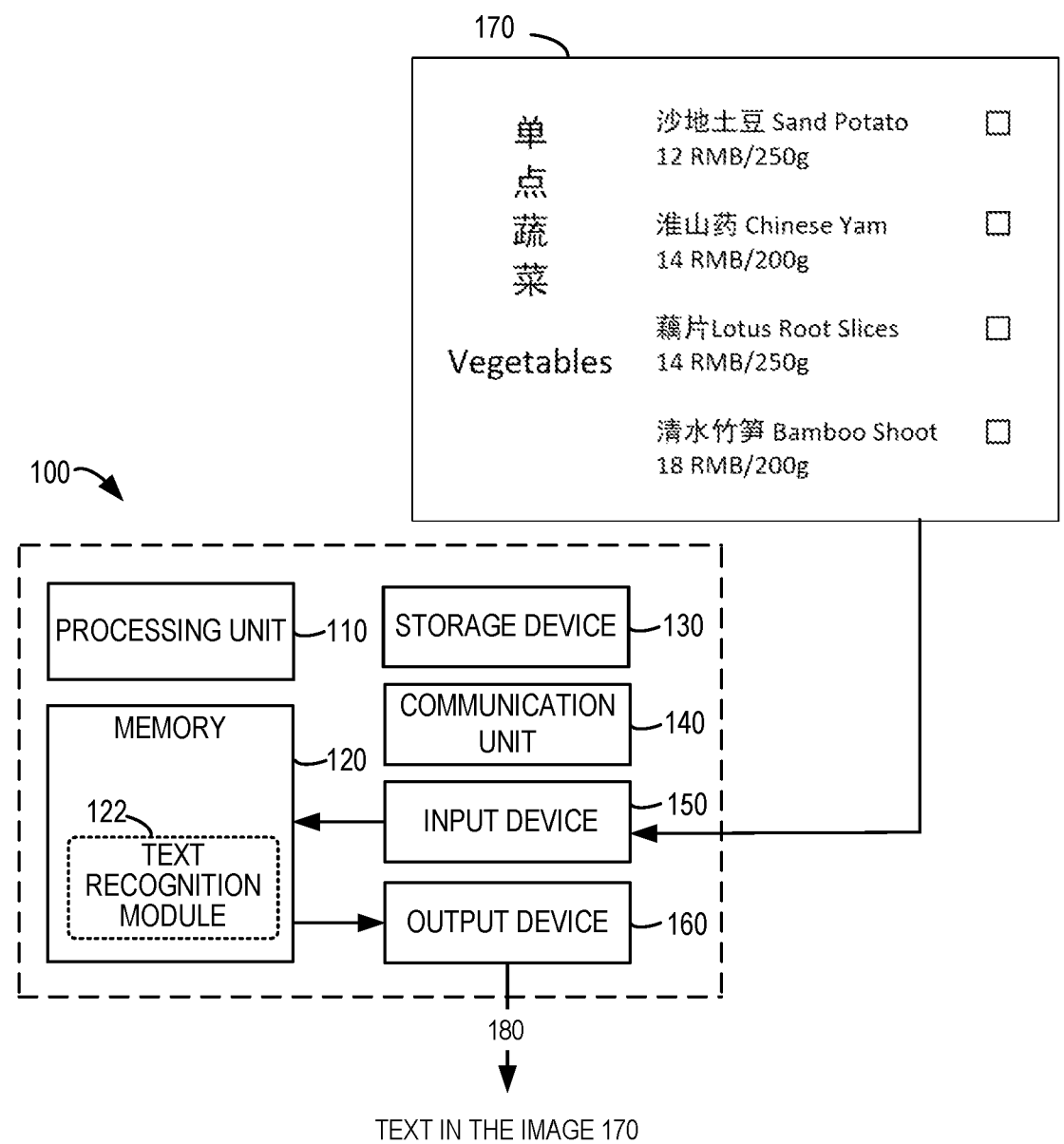
FIG. 1 illustrates a block diagram of a computing environment in which various implementations of the subject matter described herein can be implemented.

FIG. 1 illustrates a block diagram of a computing device 100 in which various implementations of the subject matter described herein can be implemented. It would be appreciated that the computing device 100 as shown in FIG. 1 is merely provided as an example, without suggesting any limitation to the functionalities and scope of implementations of the subject matter described herein. As shown in FIG. 1, the computing device 100 includes a computing device 100 in the form of a general-purpose computing device. Components of the computing device 100 can include, but are not limited to, one or more processors or processing units 110, a memory 120, a storage device 130, one or more communication units 140, one or more input devices 150, and one or more output devices 160.

In some implementations, the computing device 100 may be implemented as various user terminal or server terminal. The service terminal may be any server, large-scale computing device, and the like provided by various service providers. The user terminal may, for example, be any type of mobile terminal, fixed terminal, or portable terminal, including a mobile phone, station, unit, device, multimedia computer, multimedia tablet, Internet node, communicator, desktop computer, laptop computer, notebook computer, netbook computer, tablet computer, personal communication system (PCS) device, personal navigation device, personal digital assistant (PDA), audio/video player, digital camera/video camera, positioning device, TV receiver, radio broadcast receiver, E-book device, gaming device, or any combination thereof, including the accessories and peripherals of these devices, or any combination thereof. It is also contemplated that the computing device 100 can support any type of interface to a user (such as "wearable" circuitry and the like).

The processing unit 110 can be a physical or virtual processor and can implement various processes based on programs stored in the memory 120. In a multi-processor system, multiple processing units execute computer-executable instructions in parallel so as to improve the parallel processing capability of the computing device 100. The processing unit 110 may also be referred to as a central processing unit (CPU), a microprocessor, a controller, or a microcontroller.

The computing device 100 usually includes various computer storage medium. The computer storage medium may be any available medium accessible by the computing device 100, including but not limited to, volatile and non-volatile medium, or detachable and non-detachable medium. The memory 120 can be a volatile memory (for example, a register, cache, Random Access Memory (RAM)), non-volatile memory (for example, a Read-Only Memory (ROM), Electrically Erasable Programmable Read-Only Memory (EEPROM), flash memory), or any combination thereof. The storage device 130 may be any detachable or non-detachable medium and may include machine-readable medium such as a memory, a flash drive, a magnetic disk, or any other medium, which can be used for storing information and/or data and are accessible by the computing device 100.

The computing device 100 may further include additional detachable/non-detachable, volatile/non-volatile memory medium. Although not shown in FIG. 1, it is possible to provide a disk drive for reading from or writing into a detachable and non-volatile disk, and an optical disk drive for reading from and writing into a detachable non-volatile optical disc. In such case, each drive may be connected to a bus (not shown) via one or more data medium interfaces.

The communication unit 140 communicates with a further computing device via the communication medium. In addition, the functions of components in the computing device 100 may be implemented by a single computing cluster or multiple computing machines that can communicate with each other via communication connections. Therefore, the computing device 100 can operate in a networked environment using logic connections with one or more other servers, network personal computers (PCs), or further general network nodes.

The input device 150 may include one or more of various input devices, such as a mouse, keyboard, tracking ball, voice-input device, and the like. The output device 160 may include one or more of various output devices, such as a display, loudspeaker, printer, and the like. By means of the communication unit 140, the computing device 100 can further communicate with one or more external devices (not shown) such as storage devices and display devices, one or more devices that enable the user to interact with the computing device 100, or any devices (such as a network card, a modem and the like) that enable the computing device 100 to communicate with one or more other computing devices, if required. Such communication may be performed via input/output (I/O) interfaces (not shown).

In some implementations, as an alternative of being integrated on a single device, some or all components of the computing device 100 may also be arranged in the form of cloud computing architecture. In the cloud computing architecture, the components may be provided remotely and work together to implement the functionalities described in the subject matter described herein. In some implementations, cloud computing provides computing, software, data access and storage service, which will not require end users to be aware of the physical positions or configurations of the systems or hardware provisioning these services. In various implementations, the cloud computing provides the services via a wide area network (such as Internet) using proper protocols. For example, a cloud computing provider provides applications over the wide area network, which can be accessed through a web browser or any other computing components. The software or components of the cloud computing architecture and corresponding data may be stored in a server at a remote position. The computing resources in the cloud computing environment may be aggregated or distributed at locations of remote data centers. Cloud computing infrastructures may provide the services through a shared data center, though they behave as a single access point for the users. Therefore, the cloud computing architectures may be used to provide the components and functionalities described herein from a service provider at a remote location. Alternatively, they may be provided from a conventional server or may be installed directly or otherwise on a client device.

The computing device 100 can be used to implement text recognition in various implementations of the subject matter described herein. The memory 120 may include one or more modules having one or more program instructions. These modules can be accessed and executed by the processing unit 110 to perform the functionalities of various implementations described herein. For example, the memory 120 may include a text recognition module 122 for performing text recognition in an image.

Upon text recognition, the computing device 100 can receive an image 170 to be processed through an input device 150. The image 170 may be input or specified by the user, or obtained or received from other means. The image 170 presents a text, e.g., a Chinese text "单点蔬菜", an English text "Vegetables", a Chinese and English mixed text "沙地土豆 Sand Potato", and the like. The text recognition module 122 is configured to perform text recognition processing on the image 170 and provide the text recognized from the image 170 as an output 180. The output 180 may optionally be output via the output device 160, for example, be presented to a user or an external device. In some implementations, the output 180 may be stored for subsequent use, and/or used as an input to subsequent processing of the image 170 (e.g., information retrieval based on the image 170, or the like). The implementations of the subject matter described herein are not limited in this regard.

It should be appreciated that the components and arrangements of the computing device shown in FIG. 1 are merely examples, and a computing device suitable for implementing the example implementation described in the subject matter described herein may include one or more different components, other components, and/or different arrangements. The input image and output of text recognition shown in FIG. 1 are also only examples. The computing device may be adapted to process any other images according to example implementation of the subject matter described herein, to recognize or attempt to recognize the text in the image. The words in the text may include printed, handwritten, and ink words. The image for text recognition may be any type of image, such as a digital image captured by an electronic device, a scanned version of a document, an image including a handwritten text or ink text, and any other types of images.

As mentioned above, there may be many variations in the layout of the text presented in the image. For example, a group of characters may be arranged in an image in a vertical direction (for example, the Chinese text "单点蔬菜" in the image 170 of FIG. 1), and another group of characters may be arranged in a horizontal direction (for example, the English text "Vegetables" and other texts in the image of FIG. 170). In addition, mixed-language texts are very common in many practical applications, such as in commercial documents, store signboards, and restaurant menus, e.g., "单点蔬菜" in the image 170 of FIG. 1. As used herein, "mixed-language text" refers to a text with characters in two or more languages collocating in a sentence or part of the text. Correspondingly, "single-language text" refers to a text with characters in only one language. Certainly, in addition to language-specific characters, the mixed-language text and the single-language text may further include some universal characters such as numbers, punctuation marks, or other symbols.

Generally, most of the text recognition solutions first localize an image area from an image in which a text might present and then process the image area to recognize the text that might present therein. Considering the character arrangement directions and the difference of characters in different languages, multiple dedicated text recognition models are designed for respective orientations and multiple dedicated text recognition models are designed for different languages to process the corresponding image areas. As such, after a specific image area is localized, the orientation or the language of the text in the image area is required to be determined and then the image area is input into a text recognition model trained for the determined orientation or the language for further processing.

This process may not only increase the complexity in training the models but also require more space for model storage and more computing resources for implementing a complicated text recognition process during the practical text recognition. If texts in different orientations and in different languages are presented in one image, a corresponding text recognition model is required to be designed for a specific orientation in each language, which further increases the complexity of model training and application. Further, a text recognition result of a specific image area depend greatly on the accuracy of the orientation and language recognition from the image area, which might not be ensured in some complicated applications, for example, when the image deforms, the characters in different languages frequently occur alternately, and the like.

According to implementations of the subject matter described herein, there is provided a solution for text recognition in an image. According to this solution, instead of designing multiple dedicated models to implement language-specific or text orientation-specific text recognition separately, a single model is applied to implement recognition of texts arranged in various orientations and/or in different languages within an image. The single model applied in this solution may be a single character model which is used to determine probability distribution information of at least one character model element present in a target text line area. The single character model is trained based on a plurality of training text line areas and respective ground-truth texts in the plurality of training text line areas. Texts in the training text line areas may include texts arranged in different orientations and/or texts in a plurality of languages so that the single character model is capable of determining occurrence probabilities of characters of texts arranged in different orientations and/or in different languages.

To apply such a single character model, any target text line area determined from the image is directly provided as the model input, without the need to determine the orientation and/or the language of the text in the target text line area. The use of the single model enables quicker and more convenient text recognition, which is especially suitable for text recognition in some complicated applications (e.g., when the image has texts in a plurality of orientations and/or mixed-language texts). The use of the single model eases the requirements for storage space and computing resources. Furthermore, the single model may also simplify the model training process, without the need to train different models for specific orientations or specific languages by consuming a large amount of processing resources and time.

Example implementations of recognizing a text from an image will be further described in detail with reference to figures.

Figure 2:
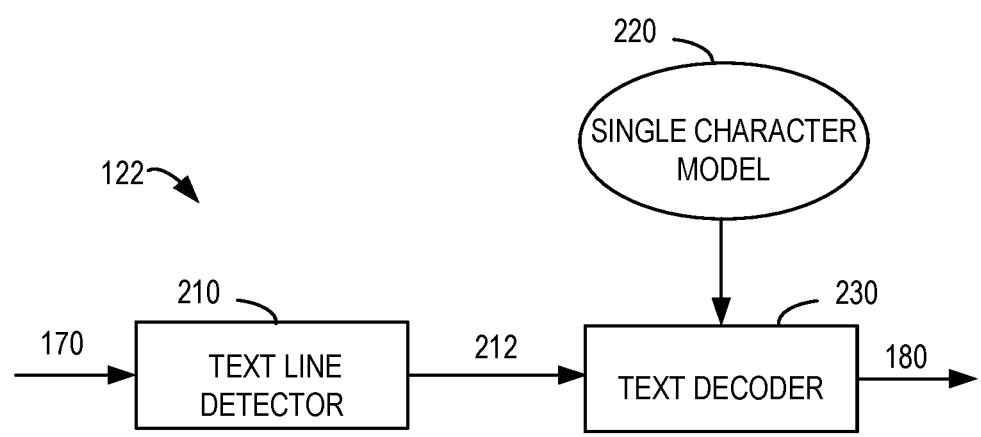
FIG. 2 illustrates a block diagram of a text recognition module in accordance with some implementations of the subject matter described herein.

FIG. 2 illustrates an example structure of a text recognition module in accordance with some implementations of the subject matter described herein. The text recognition module for example may be the text recognition module 122 in the computing device 100 of FIG. 1. For the convenience of discussion, the text recognition module will be described with reference to FIG. 1. As shown, the text recognition module 122 includes a text line detector 210, a single character model 220 and a text decoder 230 and is used to recognize partial or all texts in the image 170.

The text line detector 210 is configured to determine a target text line area 212 in the image 170. A target text line area refers to an area in the image 170 that is expected to include a text to be recognized, for example, a text area with a specific arrangement. The specific arrangement may, for example, include arranging characters of a text in a horizontal straight line, a vertical straight line, a curved line, an inclined line, or the like. The text line detector 210 may detect one or more target text line areas 212 from the image 170.

The text line detector 210 may be configured to detect or localize a target text line area 212 from the image 170 using various text line detection methods. In some implementations, the text line detector 210 may use an automatic text line detection algorithm to process the image 170, so as to determine one or more target text line areas 212 from the image 170. For example, the text line detector 210 may use a machine learning model or a neural network (e.g., a relational network-based machine learning model) to automatically detect one or more target text line areas 212 from the image 170. In determining the target text line area 212, the text line detector 210 is not required to recognize the specific characters or texts in the image 170, but to determine whether a group of pixels or larger image units in the image 170 may have a text present therein. Alternatively, or in addition, the text line detector 210 may further determine or assist in determining one or more target text line areas 212 in the image 170 in other manners such as through manual calibration. It should be appreciated that any text line detection technologies, either currently available or to be developed in the future, may be employed by the text line detector 210 to detect the target text line area 212 in the image 170.

Figure 3:
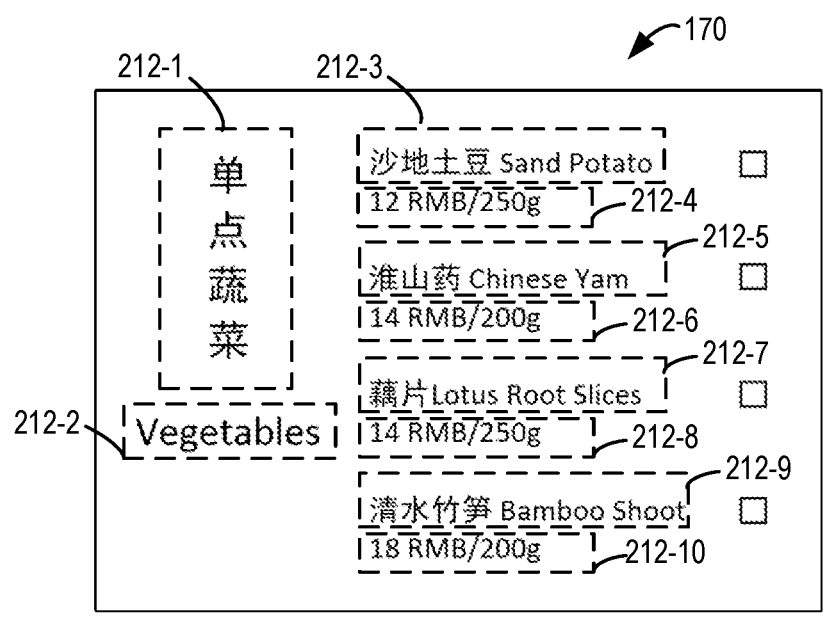
FIG. 3 illustrates an example of determining a target text line area from an image in accordance with some implementations of the subject matter described herein.

FIG. 3 shows an example of target text line areas 212 determined from the image 170. As shown in the figure, the text line detector 210 may determine a plurality of target text line areas 212-1, 212-2, . . . 212-10 in the image 170 (collectively or individually referred to as the target text line areas 212), each being expected to include a text to be recognized. It should be appreciated that the division of target text line areas shown in FIG. 3 is only an example. In other implementations, the text line detector 210 may determine one or more target text line areas in the image 170 with other sizes, dimensions, and/or orientations. For example, if a line of text in the image 170 is arranged in other ways (for example, with a plurality of characters arranged in a curved line instead of being positioned vertically or horizontally), the text line detector 210 may also detect a target text line area 212 with the line of text included therein.

In some cases, the text in the target text line area 212 of the image 170 may be arranged in any orientation. For example, in the example of FIG. 3, the text in the target text line area 212-1 is arranged in a longitudinal orientation, whereas the texts in the target text lines 212-2 to 212-10 are arranged in a transverse orientation. As used herein, a text in a "longitudinal orientation" means that a plurality of characters of the text are written (arranged) longitudinally so that the bottom of one character is closer to the top of another adjacent character; while a text in the "transverse orientation" means that a plurality of characters of the text are written (arranged) transversely so that a lateral side of one character is closer to a lateral side of another adjacent character. Upon reading, readers may usually read the text in the "longitudinal orientation" substantially from top to bottom, and read the text in the "transverse orientation" substantially from left to right. However, it should be appreciated that in the image, the text in the "longitudinal orientation" is not certainly presented in the image in an exact vertical direction, but may be offset from a vertical axis by a larger or smaller angle. Similarly, the text in the "transverse orientation" might not be presented in an exact horizontal direction in the image, but may be offset from a horizontal axis by a larger or smaller angle. The specific offset depends on the specific design of the text in the image, the process of capturing or obtaining the image, and so on.

In addition to or as an alternative of having different orientations, the text in the target text line area 212 of the image 170 may further have characters in different languages. In some cases, the text in one target text line area 212 may include one or more characters in a single language. For example, the target text line area 212-1 in FIG. 3 includes a plurality of Chinese characters only, the target text line area 212-2 includes a plurality of English letters only, and the target text line areas 212-3, 212-5, 212-7, and 212-9 in FIG. 3 include mixed-language texts with Chinese characters and English letters. In some implementations, in addition to characters in various languages, the one or more target text line areas 212 (e.g., the target text line areas 212-4, 212-6, 212-8, and 212-10 in FIG. 3) may further include other universal symbols, such as numbers, punctuation marks, currency symbols, and the like.

According to the implementation of the subject matter described herein, it is desired to use a single model to recognize the texts in the target text line areas 212 with any orientations and/or in different languages, without the need to specifically distinguish the orientations and/or languages of the texts. Specifically, the text decoder 230 may use the single character model 220 to facilitate such unified recognition.

In some implementations, before being provided to the text decoder 230, a target text line area 212 determined from the image 170 may be subject to some pre-processing. The text recognition module 122 may include one or more sub-modules (not shown) for performing respective pre-processing operations on the target text line area 212. In some implementations, the objective of the pre-processing is to normalize different target text line areas recognized from the image to a single shape and/or size to facilitate the analysis and processing in the single character model 220 and the text decoder 230.

Figure 4A:
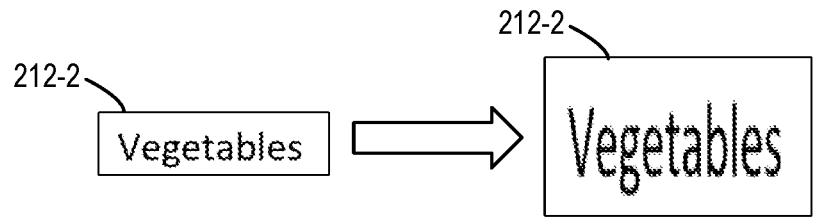
FIGS. 4A-4C illustrate some examples of text line pre-processing in accordance with some implementations of the subject matter described herein.
Figure 4B:
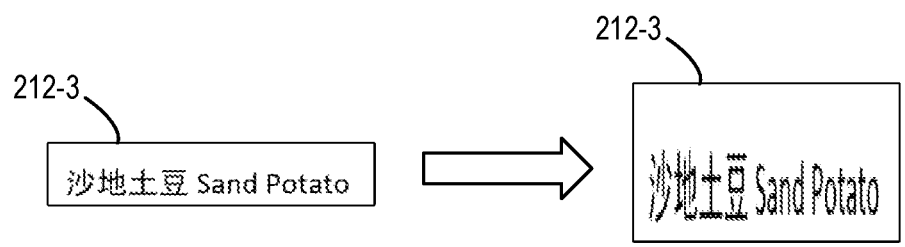

In some examples, the pre-processing operations may include a size normalization operation, to zoom in or out the target text line area to a predetermined size for subsequent processing. For example, FIG. 4A and FIG. 4B show that the target text line areas 212-1 and 212-2 in the image 170 are scaled to a predetermined size.

Figure 4C:
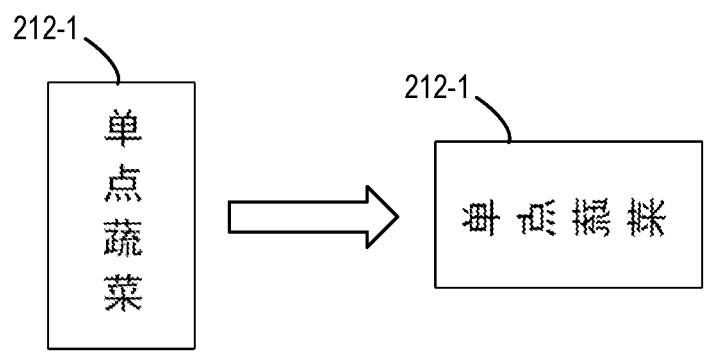

Alternatively, or in addition, the pre-processing operations may further include orientation classification and a rotation operation based on the orientation classification, which is to make characters of the text in one line distributed in a predetermined direction. For example, the target text line area 212 having a text in the longitudinal orientation may be rotated so that a plurality of characters in the text are distributed in the horizontal direction. As shown in FIG. 4C, the target text line area 212-1 having the text in the longitudinal orientation may be rotated anticlockwise by 90 degrees so that the plurality of characters are sequentially distributed in the horizontal direction. The text inclined at other angles relative to the vertical axis can also be rotated so that the characters are sequentially distributed in the horizontal direction. The target text line area, which has a transverse-oriented text originally distributed in the horizontal direction, may remain unchanged. If the transverse-oriented text in the target text line area is inclined by a certain angle with respect to the horizontal axis, the target text line area may also be rotated to the horizontal direction. In another example, the target text line areas with texts in different orientations and different inclination angles may also be rotated to be sequentially distributed in the vertical direction, or may also be rotated to be at a specific angle relative to the vertical or horizontal axis (e.g., inclined by 45 degrees).

In some other examples, if the target text line area 212 has a curved line (i.e., having a curved line to define a line of text), the target text line area 212 may be calibrated to be a text line area having a predetermined shape (e.g., a rectangular shape). For example, if a target text line area 212 has a plurality of characters arranged in a curved line, this target text line area may be corrected to a predetermined shape through various calibration operations such as stretching and shrinking. Alternatively, or in addition, if the text in the target text line area 212 is mirrored, a mirror processing may also be performed on the target text line area 212.

It should be appreciated that the above are only some examples of pre-processing operations applied to the target text line area 212. Depending on the actual applications, other pre-processing operations may be additionally or alternatively applied. The scope of implementations of the subject matter described herein is not limited in this regard.

Referring back to FIG. 2, the target text line area 212 (after the pre-processing) is provided to the text decoder 230. The text decoder 230 determines probability distribution information of one or more character model elements in the target text line area 212 using the trained single character model 220. As used herein, a character model element is a basic element for which the single character model 220 performs probability prediction, each character model element including one or more characters or symbols from a predetermined character set. The probability distribution information indicates a conditional probability of each possible character model element belonging to the target text line area 212. In some implementations, the text decoder 230 uses the single character model 220 to determine a sequence of character model elements with maximum occurrence probabilities in the target text line area 212.

The predetermined character set may include a plurality of characters used in at least one predetermined language. The characters may be basic elements used in the language. In a Latin language family, a character includes a letter that is used to form a word, and in an Eastern language, a character may include a single word. The characters included in the predetermined character set specifically depend on the design of the single character model 220, which will be discussed in more detail below. In some implementations, in addition to the characters in the specific language(s), the predetermined character set may further include one or more universal symbols, such as numbers, punctuation marks used in the language(s), currency symbols, and/or other symbols.

In some implementations, the single character model 220 may be configured to be "unified" for different orientations of texts, which means that the single character model 220 is capable of processing target text line areas with texts arranged in any orientations. In some implementations, the single character model 220 may be configured to be "unified" for texts in different languages, which means that the single character model 220 is capable of processing target text line areas with texts in different languages (e.g., single-language texts or mixed-language texts in different languages). In some further implementations, the single character model 220 may also be configured to be both "unified" for texts in different orientations and in a plurality of languages, which means that the single model can be used to implement recognition of texts in any orientations and a plurality of languages. Therefore, the use of the single character model 220 releases the requirement on determining the orientation and/or the language of the text in a target text line area.

In the implementations of the subject matter described herein, in order to obtain the capability of recognizing texts in different orientations and/or in multiple languages, the single character model 220 is configured as a machine learning model which acquires the corresponding capability from training data through machine learning. The training data for training the single character model 220 includes a plurality of training text line areas and the texts labeled for these training text line areas (also referred to as "ground-truth texts" or "known texts"). In some implementations, to enable the single character model 220 to recognize texts arranged in different orientations in various target text line areas, the plurality of training text line areas used in the training phase include ground-truth texts in different orientations. For example, the ground-truth texts in some training text line areas are arranged in a longitudinal orientation, while the ground-truth texts in some other training text line areas are arranged in a transverse orientation. In order to achieve more accurate model training, the training text line areas and the ground-truth texts present therein may have different angular variations in the longitudinal orientation or the transverse orientation, for example, offsets with respect to the vertical axis or the horizontal axis by some angle. In some implementations, the training text line areas may also be used for model training after some pre-processing (e.g., size normalization, rotation, correction, mirror operation, and/or the like).

In some implementations, to enable the single character model 220 to recognize character model elements in the plurality of languages that may be present in a target text line area, during the training phase, the ground-truth texts in the plurality of training text line areas of the training data may include a plurality of texts related to these languages. The text for training may include single-language texts in each of the languages, and in some cases may also include mixed-language texts. Here, a mixed-language text may include characters in any two or more of the predetermined languages. In some cases, the mixed-language text is not necessary. By using single-language texts in the plurality of different languages as the training data, the single character model 220 can also learn therefrom the character features in the different languages and thus can recognize the single-language texts and mixed-language texts in those languages.

In some implementations, the ground-truth texts in the training data may include texts in a Latin language(s) and texts in an Eastern language(s), including one or more characters in at least one Latin language and one or more characters in at least one Eastern language. The Latin language includes, but is not limited to, English, French, German, Dutch, Italian, Spanish, Portuguese, and variant languages thereof. The Eastern language is sometimes referred to as an Asian language, including but not limited to Chinese (including Simplified Chinese and Traditional Chinese), Japanese, Korean, and variant languages thereof. Chinese, Japanese and Korean are also collectively referred to as CJK languages. For example, the ground-truth texts may include single-Chinese texts in one or more training text line areas, single-English texts in one or more training text line areas, and may probably include Chinese and English-mixed texts present in one or more training text line areas. The ground-truth texts for training the single character model 220 may further include texts in three or more languages, for example, including Chinese, Japanese, and English. It should be appreciated that the single character model 220 may also be trained using training text line areas and ground-truth texts corresponding to one or more languages other than Latin languages and Eastern languages.

In some implementations, in addition to a mixture of different language families or as an alternative, the ground-truth texts in the training data may further include texts in different languages of the same language family or similar language families. For example, the ground-truth texts for training may include texts in different Latin languages (e.g., English and French), texts in different Eastern languages (e.g., Chinese and Japanese), and/or their mixed-language texts. In summary, if the single character model 220 is expected to recognize texts in a plurality of languages, the ground-truth texts in those languages may be used as training data for model training.

In some implementations, if the single character model 220 is expected to perform probability distribution determination of character model elements for texts in any orientations and in a plurality of languages, the training data may be selected to have variations in the two aspects, namely, the text orientations and languages. That is, texts in some training text line areas are arranged in a plurality of different orientations, and texts in some training text line areas include characters in the plurality of predetermined languages. It should be understood that if it only needs to train the single character model 220 as having the capability of recognizing texts arranged in different orientations, the ground-truth texts in the training text line areas may include characters in a single language. Similarly, if the single character model 220 only needs to be trained as having the ability to recognize texts in a plurality of languages without the unified requirement for text orientation, all the ground-truth texts in the training text line areas may be arranged only in a single orientation (in the longitudinal direction or transverse direction).

As mentioned above, the single character model 220 is to be trained to determine the probability distribution information of character model elements in the target text line area. Depending on the design of the single character model 220, the predetermined character set includes characters present in the language(s) related to the single character model 220. For example, if the single character model 220 is only trained to recognize texts arranged in different orientations in a certain language, the predetermined character set includes characters in that language and one or more universal symbols that may appear in the use of that language. If the single character model 220 is trained to recognize texts in a plurality of languages, the predetermined character set may include characters in those languages and one or more universal symbols that might appear in the use of those languages.

Depending on the model selection and specific configuration, the single character model 220 may be trained with different frameworks, different model structures, and different objective functions. In some implementations, the machine learning algorithms that may be used for the single character model 220 may include algorithms suitable for image processing and natural language processing, examples of which include, but are not limited to, a convolutional neural network (CNN), a long short-term memory (LSTM) model, a Deep Bidirectional LSTM (DB LSTM) model, a Recurrent Neural Network (RNN), a Transformer, a Feed-Forward Sequential Memory Network (FSMN), an attention-based codec model, a decision tree-based model (e.g., a random forest model), a Support Vector Machine (SVM), any combinations thereof, and the like. Specific working principles of these models/networks are known to those skilled in the art, and will not be described in detail herein. For example, the single character model 220 may be a combination of models based on CNN and DB LSTM. It should also be appreciated that improvements on machine learning model, either currently-developed or to be developed in the future, may also be applied to the example implementation of the subject matter described herein.

The training process of the single character model 220 makes the model to learn, from the training data, and focus on specific features of the characters (and universal symbols) in different orientations and/or different languages. The single character model 220 may be trained based on the selected model architecture using different objective functions, for example, Connectionist Temporal Classification (CTC), minimum cross-entropy (CE) estimation criterion, Maximum Mutual Information Estimation (MMIE), Minimum Classification Error (MCE) criterion, Minimum Word Error/Minimum Phoneme Error (MWE/MPE) Criterion and other distinguishing training criteria. Alternatively, or in addition, the training of the single character model 220 may be completed using stochastic gradient descent, forward error correction and so on. In some implementations, the training of the single character model 220 may be performed by a device other than the computing device 100 that performs the text recognition, for example, by a device with more computing powers. Of course, in some implementations, the model training may also be implemented by the computing device 100 (alone or in combination with other computing devices).

The above has discussed how the single character model 220 achieves the unification in terms of text orientations and languages. The single character model 220 obtained through the training can thus be used to perform a composite text recognition task. In this case, it is possible to directly input a target text line area 212 into the text decoder 230 which uses the single character model 220 to decode and obtain an optimal sequence of character model elements, without the need to worry about the text orientation and/or mixture of languages in the target text line area 212.

In some implementations, in addition to the single character model 220, the text decoder 230 may obtain a better text recognition result by means of a language model and a predetermined lexicon. The predetermined lexicon includes textual elements in different languages. As used herein, a textual element refers to a text fragment having a specific meaning in a language, such as a word, phrase, sentence, or the like. A textual element includes one or more character model elements. In some implementations, the predetermined lexicon also indicates a mapping of textual elements and character model elements (that is, indicates of which character model element(s) each textual element is consisted). The language model is used to apply a constraint on a grammatical relationship between textual elements in each language.

For all the possible sequences of character model elements, the text decoder 230 selects a sequence of character model elements with an optimal comprehensive score as a recognition result based on the probability distribution information of the character model elements calculated from the target text line area 212 using the single character model 220 in conjunction with the textual elements in the lexicon 520, and linguistic constraint scores calculated from the single language model 510 at the level of the textual elements.

The language model may, for example, be an n-gram language model used in natural language processing. Some other examples of the language model include other Neural Network Language Models (NNLM) such as a maximum entropy model, a hidden Markov model (HMM), a Conditional Random Field (CRF) model, a Recurrent Neural Network (RNN), a Long Short-Term Memory (LSTM) model, a Gated Recurrent Unit (GRU) Model, or a Transformer. The specific working principles of these models/networks are known to those skilled in the art and will not be described in detail here. Through the training process, the language model can be trained to measure whether a sequence of character model elements meets the constraint(s) (e.g., the grammatical constraint(s)) of one or more specific languages. By using the language model, the resulting text can meet the constraints of the one or more predetermined languages, and turn out to be a meaningful text that may actually appear.

Figure 5:
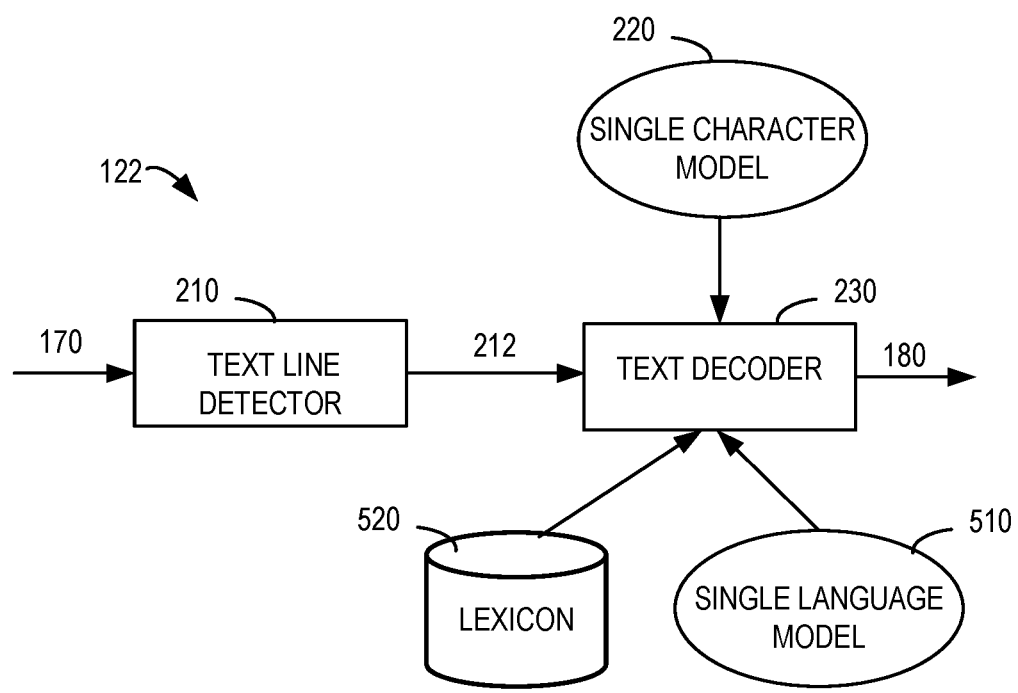
FIG. 5 illustrates a block diagram of the text recognition module in accordance with some other implementations of the subject matter described herein.

In some implementations, the language model may be a single language model capable of applying constraints of a plurality of predetermined languages in the text recognition from the target text line area 212. FIG. 5 shows an example of the text recognition module 122 according to some implementations of the present disclosure, in which a single language model 510 and a predetermined lexicon 520 are added. The lexicon 520 may be stored in an internal storage device or an external storage device of the computing device 100 and accessible by the text recognition module 122. The plurality of predetermined languages may include various different languages, for example, one or more Latin languages, one or more Eastern languages, and/or any other languages. The "unification" of the single language model 510 indicates that a single model can be used to learn and apply the constraints (e.g., grammatical constraints) of a plurality of different languages in a unified manner, to recognize texts or mixed texts in those languages.

Among a plurality of predetermined languages, the number of commonly-used textual elements and the lengths of characters included therein in the different languages may be varied greatly. For example, words in Latin languages and words in Eastern languages are different. Therefore, in order to balance the size of sets of textual elements in different languages and to enable recognition of some out-of-vocabulary words that are not included in the lexicon 520, in some implementations, sub-words (also referred to as "textual sub-elements") may be used as basic elements of the language model and the predetermined lexicon of some languages. A textual sub-element may include a part of a textual element in the Latin language. New vocabulary may usually be produced in the Latin language because as the language is used and develops, different characters may be used to form new textual elements (for example, new words). The textual sub-elements may be included in the lexicon 520, and the combinations of these textual sub-elements can thus cover the possible new textual elements.

One or more textual sub-elements may be obtained in various manners, including a word morphology analysis method using stem suffix segmentation, a sub-word learning method based on a large-scale corpus (such as Morfessor, G1G, and byte pair encoding (BPE)) and the like. If the BPE algorithm is adopted, textual sub-elements may be learnt, using the BPE algorithm, from the existing corpus with words as textual elements or based on word frequency statistics calculated in advance. In some implementations, after one or more textual sub-elements are obtained, the textual elements in the corpus for training the language model may be converted into corresponding sequences of textual sub-elements through the BPE algorithm, which are then used to train various types of language models.

In some implementations, the plurality of predetermined languages for the single language model 510 may correspond to texts in the plurality of predetermined languages that can be processed by the single character model 220. Specifically, if the single character model 220 is configured to determine the probability distribution information of characters in a plurality of predetermined languages (for example, Latin and Eastern languages) in the target text line areas 212, the single language model 510 is also configured to determine and apply the constraints of those predetermined languages, to recognize the corresponding texts in the target text line area 212. Alternatively, if the single character model 220 is configured to process the texts in any orientations in a specific language, the single language model 510 may be configured to determine and apply the constraints of the specific language and one or more other languages (e.g., if there is one or more other single character models configured to process texts in any orientations in the one or more other languages).

In order to obtain the capability of determining and applying the constraints of the plurality of languages, the single language model 510 is configured as a machine learning model which acquires the corresponding capability from training data through machine learning. The training data for training the single language model 510 may include a corpus based on the plurality of predetermined languages. The single language model 510 can calculate scores for the grammatical expressions of respective sentences consisting of any one or more textual elements in the specific languages. Thus, the single language model 510 may determine whether a certain combination of characters in a target text line area meets the constraints of the specific language at a larger granularity (e.g., the textual element granularity) than the character granularity.

The corpus includes language materials that appear in the actual use of the plurality of languages for the single language model 510, including the language materials from various sources such as novels, web pages, news, newspapers and magazines, papers, blogs, and so on. The language materials obtained from the various sources may be digitalized and stored in the corpus after some analysis and processing, for use in model training. In some implementations, the corpus may include single-language texts in the plurality of languages, and may also include mixed-language texts in the plurality of languages.

Depending on the specific language model used, a corresponding training algorithm may be used to train the single language model 510. The implementations of the subject matter described herein are not limited in terms of the specific training algorithm for the single language model 510. In some implementations, the training of the single language model 510 may be completed by a device other than the computing device 100 that performs the text recognition, for example, by a device with more computing power. Of course, in some implementations, the model training may also be performed by the computing device 100 (alone or in combination with other computing devices).

It should be appreciated that although the single language model is discussed above, in some implementations, a language-specific language model may be applied to apply constraints. For example, if the single character model 220 determines the probability distribution information of character model elements in the target text line areas in a unified manner with respect to a plurality of predetermined languages, a plurality of language models may be applied to apply the respective constraints of those predetermined languages.

In determining the text in a target text line area 212, the text decoder 230 recognizes the text in the target text line area 212 as the output 180 based on the probability distribution information of the single character model 220 and by use of the textual elements of the lexicon 520 and the constraints applied by the single language model 510. In some implementations, the text decoder 230 may determine the text in the target text line area 212 by using a decoding model (or decoding network) based on a Weighted Finite State Transducer (WFST). For any input sequence (such as a sequence of character model elements), the WFST may determine whether to receive this sequence or not and if it is received, outputs its corresponding output sequence (such as a word sequence) and its score.

The text recognition applied on the target text line area 212 may be considered as using an efficient search algorithm and combining the optimization by the lexicon and the language mode into the WFST network, to quickly find a comprehensively optimal path based on the probability scores of the character model elements provided by the character model, where the output result corresponding to the path is the recognized text. It should be appreciated that other than the WFST-based decoding model, other algorithms for searching and decoding in combination of the character model, language model, and lexicon statically or dynamically may also be employed in the text decoder 230.

In some implementations, to further improve the accuracy of text recognition, the text recognition module 122 may further include additional submodules (not shown) for further determine whether the text determined by the text decoder 230 for the target text line area 212 is correct or applicable. For example, the text recognition module 122 may further include an accept/reject sub-module to determine whether the text output by the text decoder 230 is a text that may appear in the actual use of the language, for example, a practically meaningful text. This can avoid misrecognition of a non-text pattern appearing in the image as a text. As another example, the text recognition module 122 may further include a confidence sub-module to determine the reliability of the text output by the text decoder 230. It should be appreciated that the text recognition module 122 may additionally or alternatively include one or more other sub-modules to implement other expected functions. The implementations of the subject matter described herein are not limited in this regard.

One or more sub-modules the text recognition module 122—such as the text line detector 210, the single character model 220, the single language model 510, and the text decoder 230, implement their corresponding functions using machine learning or deep learning models/networks. In such implementations, the corresponding machine learning or deep learning models/networks may be trained separately based on the corresponding training data for the functions to be implemented by each submodule. It is also possible to perform end-to-end training on the plurality of machine learning or deep learning models/networks included in the text recognition module 122 after the separate training or at the very beginning, so as to achieve the target of recognizing the text from the input image. In some implementations, the text line detector 210 may be trained separately from other sub-modules. Of course, other implementations may are also possible, without suggesting any limitation in this regard.

Figure 6A:
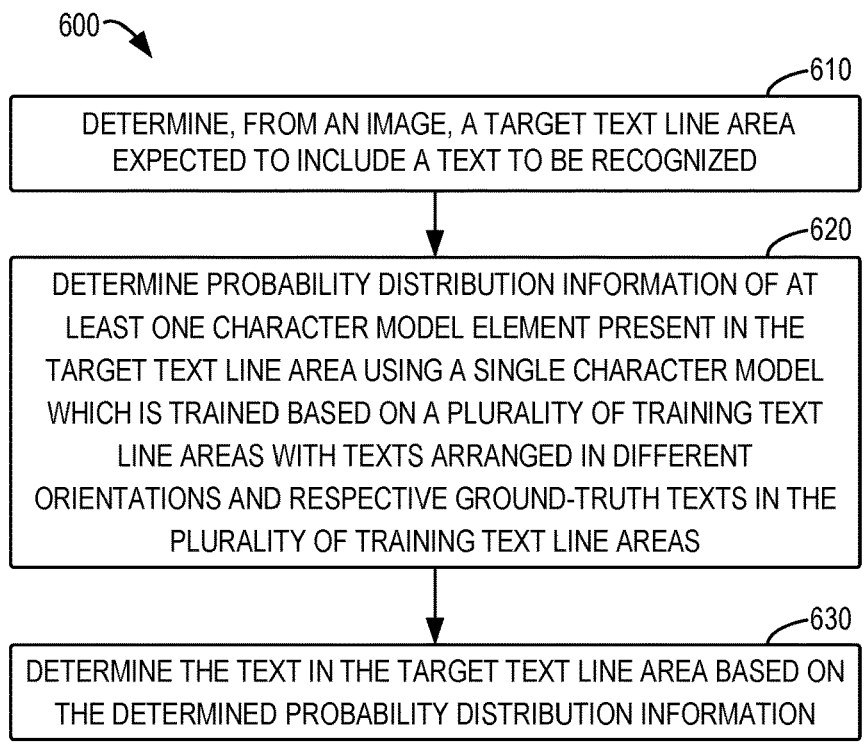
FIGS. 6A-6B illustrate flowcharts of processes for text recognition in accordance with some implementations of the subject matter described herein.

FIG. 6A illustrates a flowchart of a process 600 in accordance with some implementations of the subject matter described herein. The process 600 can be implemented by the computing device 100, for example, by the text recognition module 122 module 122 of the computing device 100.

At block 610, the computing device 100 determines, from an image, a target text line area expected to include a text to be recognized. At block 620, the computing device 100 determines probability distribution information of at least one character model element present in the target text line area using a single character model which is trained based on a plurality of training text line areas with texts arranged in different orientations and respective ground-truth texts in the plurality of training text line areas. At block 630, the computing device 100 determines the text in the target text line area based on the determined probability distribution information.

In some implementations, the respective ground-truth texts in the plurality of training text line areas comprise a plurality of texts related to a plurality of predetermined languages, each of the plurality of texts comprising a single-language text or a mixed-language text.

In some implementations, the plurality of predetermined languages comprise at least one of the following: at least one Latin language, and at least one Eastern language.

In some implementations, determining the text in the target text line area comprises: generating the text in the target text line area based on the determined probability distribution information and by use of a single language model and a predetermined lexicon, wherein the predetermined lexicon at least comprises textual elements in a plurality of predetermined languages, each textual element comprising at least one character model element, and the single language model is used to apply a constraint on a grammatical relationship between the textual elements in the plurality of predetermined languages.

In some implementations, if the plurality of predetermined languages comprise a Latin language, the predetermined lexicon further comprises at least one textual sub-element determined from a corpus in the Latin language, each textual sub-element comprising a part of a textual element in the Latin language. In some implementations, the plurality of predetermined languages comprise at least one Eastern language.

In some implementations, the determining of the at least one textual sub-element comprises byte pair encoding (BPE) performed on the corpus in the Latin language.

In some implementations, the single language model comprises an n-gram language model.

In some implementations, determining the text in the target text line area comprises: determining the text in the target text line area using a decoding model based on a weighted finite-state transducer (WFST).

Figure 6B:
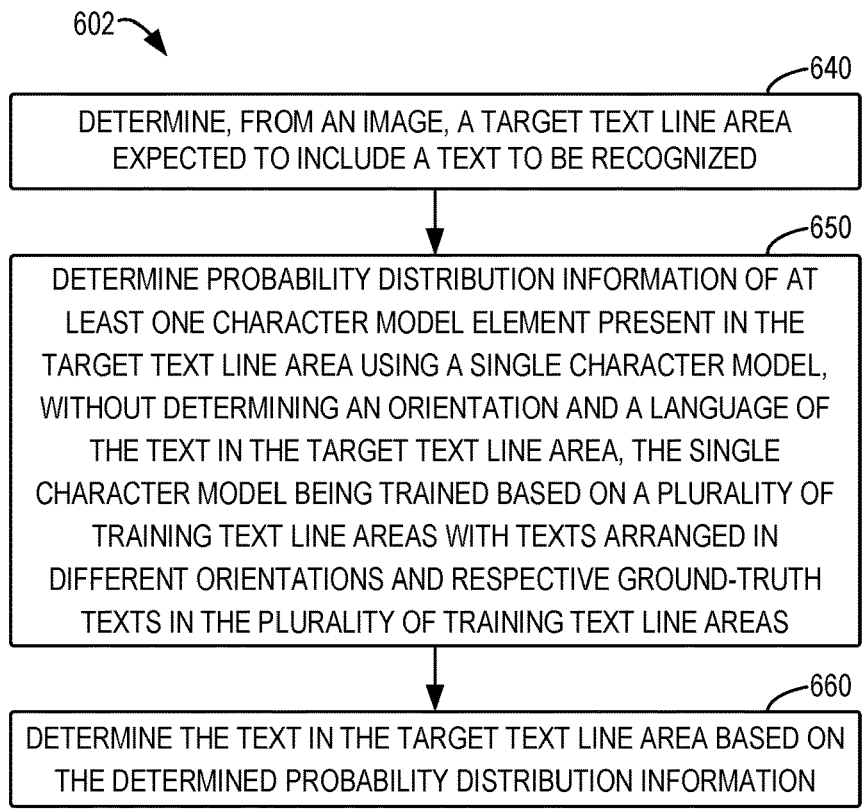

FIG. 6B illustrates a flowchart of a process 602 in accordance with some implementations of the subject matter described herein. The process 602 can be implemented by the computing device 100, for example, by the text recognition module 122 module 122 of the computing device 100.

At block 640, the computing device 100 determines, from an image, a target text line area expected to include a text to be recognized. At block 650, the computing device 100 determines probability distribution information of at least one character model element present in the target text line area using a single character model, without determining an orientation and a language of the text in the target text line area, the single character model being trained based on a plurality of training text line areas with texts arranged in different orientations and respective ground-truth texts in the plurality of training text line areas, the ground-truth texts comprising at least texts related to a Latin language and an Eastern language. Each character model element comprises at least one character or symbol. At block 660, the computing device 100 determines the text in the target text line area based on the determined probability distribution information.

In some implementations, determining the text in the target text line area comprises: generating the text in the target text line area based on the determined probability distribution information and by use of a single language model and a predetermined lexicon, wherein the predetermined lexicon at least comprises textual elements in a plurality of predetermined languages, each textual element comprising at least one character model element, and the single language model is used to apply a constraint on a grammatical relationship between the textual elements in the plurality of predetermined languages.

In some implementations, if the plurality of predetermined languages comprise a Latin language, the predetermined lexicon further comprises at least one textual sub-element determined from a corpus in the Latin language, each textual sub-element comprising a part of a textual element in the Latin language. In some implementations, the plurality of predetermined languages comprise at least one Eastern language.

In some implementations, the determining of the at least one textual sub-element comprises byte pair encoding (BPE) performed on the corpus in the Latin language.

In some implementations, the single language model comprises an n-gram language model.

In some implementations, determining the text in the target text line area comprises: determining the text in the target text line area using a decoding model based on a weighted finite-state transducer (WFST).

Some example implementations of the subject matter described herein are listed below.

In a first aspect, the subject matter described herein provides a computer-implemented method. The method comprises: determining, from an image, a target text line area expected to include a text to be recognized; determining probability distribution information of at least one character model element present in the target text line area using a single character model, each character model element comprising at least one character or symbol, and the single character model being trained based on a plurality of training text line areas with texts arranged in different orientations and respective ground-truth texts in the plurality of training text line areas; and determining the text in the target text line area based on the determined probability distribution information.

In some implementations, the respective ground-truth texts in the plurality of training text line areas comprise a plurality of texts related to a plurality of predetermined languages, each of the plurality of texts comprising a single-language text or a mixed-language text.

In some implementations, the plurality of predetermined languages comprise at least one of the following: at least one Latin language, and at least one Eastern language.

In some implementations, determining the text in the target text line area comprises: generating the text in the target text line area based on the determined probability distribution information and by use of a single language model and a predetermined lexicon, wherein the predetermined lexicon at least comprises textual elements in a plurality of predetermined languages, each textual element comprising at least one character model element, and the single language model is used to apply a constraint on a grammatical relationship between the textual elements in the plurality of predetermined languages.

In some implementations, if the plurality of predetermined languages comprise a Latin language, the predetermined lexicon further comprises at least one textual sub-element determined from a corpus in the Latin language, each textual sub-element comprising a part of a textual element in the Latin language. In some implementations, the plurality of predetermined languages comprise at least one Eastern language.

In some implementations, the determining of the at least one textual sub-element comprises byte pair encoding (BPE) performed on the corpus in the Latin language.

In some implementations, the single language model comprises an n-gram language model.

In some implementations, determining the text in the target text line area comprises: determining the text in the target text line area using a decoding model based on a weighted finite-state transducer (WFST).

In a second aspect, the subject matter described herein provides an electronic device. The electronic device comprises: a processing unit; and a memory coupled to the processing unit and having instructions stored thereon, the instructions, when executed by the processing unit, causing the device to perform acts of: determining, from an image, a target text line area expected to include a text to be recognized; determining probability distribution information of at least one character model element present in the target text line area using a single character model, each character model element comprising at least one character or symbol, and the single character model being trained based on a plurality of training text line areas with texts arranged in different orientations and respective ground-truth texts in the plurality of training text line areas; and determining the text in the target text line area based on the determined probability distribution information.

In some implementations, the respective ground-truth texts in the plurality of training text line areas comprise a plurality of texts related to a plurality of predetermined languages, each of the plurality of texts comprising a single-language text or a mixed-language text.

In some implementations, the plurality of predetermined languages comprise at least one of the following: at least one Latin language, and at least one Eastern language.

In some implementations, determining the text in the target text line area comprises: generating the text in the target text line area based on the determined probability distribution information and by use of a single language model and a predetermined lexicon, wherein the predetermined lexicon at least comprises textual elements in a plurality of predetermined languages, each textual element comprising at least one character model element, and the single language model is used to apply a constraint on a grammatical relationship between the textual elements in the plurality of predetermined languages.

In some implementations, if the plurality of predetermined languages comprise a Latin language, the predetermined lexicon further comprises at least one textual sub-element determined from a corpus in the Latin language, each textual sub-element comprising a part of a textual element in the Latin language. In some implementations, the plurality of predetermined languages comprise at least one Eastern language.

In some implementations, the determining of the at least one textual sub-element comprises byte pair encoding (BPE) performed on the corpus in the Latin language.

In some implementations, the single language model comprises an n-gram language model.

In some implementations, determining the text in the target text line area comprises: determining the text in the target text line area using a decoding model based on a weighted finite-state transducer (WFST).

In a third aspect, the subject matter described herein provides a computer program product being tangibly stored in a non-transitory computer storage medium and comprising machine-executable instructions, the machine-executable instructions, when executed by a device, causing the device to perform one or more implementations of the above method.

In a fourth aspect, the subject matter described herein provides a computer readable medium having machine-executable instructions stored thereon, the machine-executable instructions, when executed by a device, causing the device to perform one or more implementations of the method according to the above first aspect.

In a fifth aspect, the subject matter described herein provides a computer-implemented method. The method comprises: determining, from an image, a target text line area expected to include a text to be recognized; determining probability distribution information of at least one character model element present in the target text line area using a single character model, without determining an orientation and a language of the text in the target text line area, each character model element comprising at least one character or symbol, and the single character model being trained based on a plurality of training text line areas with texts arranged in different orientations and respective ground-truth texts in the plurality of training text line areas, the ground-truth texts comprising at least texts related to a Latin language and an Eastern language; and determining the text in the target text line area based on the determined probability distribution information.

In some implementations, determining the text in the target text line area comprises: generating the text in the target text line area based on the determined probability distribution information and by use of a single language model and a predetermined lexicon, wherein the predetermined lexicon at least comprises textual elements in a plurality of predetermined languages, each textual element comprising at least one character model element, and the single language model is used to apply a constraint on a grammatical relationship between the textual elements in the plurality of predetermined languages.

In some implementations, if the plurality of predetermined languages comprise a Latin language, the predetermined lexicon further comprises at least one textual sub-element determined from a corpus in the Latin language, each textual sub-element comprising a part of a textual element in the Latin language. In some implementations, the plurality of predetermined languages comprise at least one Eastern language.

In some implementations, the at least one textual sub-element is determined by performing byte pair encoding (BPE) on the corpus in the Latin language.

In some implementations, the single language model comprises an n-gram language model.

In some implementations, determining the text in the target text line area comprises: determining the text in the target text line area using a decoding model based on a weighted finite-state transducer (WFST).

In a sixth aspect, the subject matter described herein provides an electronic device. The electronic device comprises: a processing unit; and a memory coupled to the processing unit and having instructions stored thereon, the instructions, when executed by the processing unit, causing the device to perform acts of: determining, from an image, a target text line area expected to include a text to be recognized; determining probability distribution information of at least one character model element present in the target text line area using a single character model, without determining an orientation and a language of the text in the target text line area, each character model element comprising at least one character or symbol, and the single character model being trained based on a plurality of training text line areas with texts arranged in different orientations and respective ground-truth texts in the plurality of training text line areas, the ground-truth texts comprising at least texts related to a Latin language and an Eastern language; and determining the text in the target text line area based on the determined probability distribution information.

In some implementations, determining the text in the target text line area comprises: generating the text in the target text line area based on the determined probability distribution information and by use of a single language model and a predetermined lexicon, wherein the predetermined lexicon at least comprises textual elements in a plurality of predetermined languages, each textual element comprising at least one character model element, and the single language model is used to apply a constraint on a grammatical relationship between the textual elements in the plurality of predetermined languages.

In some implementations, if the plurality of predetermined languages comprise a Latin language, the predetermined lexicon further comprises at least one textual sub-element determined from a corpus in the Latin language, each textual sub-element comprising a part of a textual element in the Latin language. In some implementations, the plurality of predetermined languages comprise at least one Eastern language.

In some implementations, the determining of the at least one textual sub-element comprises byte pair encoding (BPE) performed on the corpus in the Latin language.

In some implementations, the single language model comprises an n-gram language model.

In some implementations, determining the text in the target text line area comprises: determining the text in the target text line area using a decoding model based on a weighted finite-state transducer (WFST).

In a seventh aspect, the subject matter described herein provides a computer program product being tangibly stored in a non-transitory computer storage medium and comprising machine-executable instructions, the machine-executable instructions, when executed by a device, causing the device to perform one or more implementations of the above method.

In an eighth aspect, the subject matter described herein provides a computer readable medium having machine-executable instructions stored thereon, the machine-executable instructions, when executed by a device, causing the device to perform one or more implementations of the method according to the above fifth aspect.

The functionalities described herein can be performed, at least in part, by one or more hardware logic components. As an example, and without limitation, illustrative types of hardware logic components that can be used include field-programmable gate arrays (FPGAs), Application-specific Integrated Circuits (ASICs), application-specific standard products (ASSPs), system-on-a-chip systems (SOCs), complex programmable logic devices (CPLDs), and the like.

Program code for carrying out the methods of the subject matter described herein may be written in any combination of one or more programming languages. The program code may be provided to a processor or controller of a general-purpose computer, special purpose computer, or other programmable data processing apparatus such that the program code, when executed by the processor or controller, causes the functions/operations specified in the flowcharts and/or block diagrams to be implemented. The program code may be executed entirely or partly on a machine, executed as a stand-alone software package partly on the machine, partly on a remote machine, or entirely on the remote machine or server.

In the context of this disclosure, a machine-readable medium may be any tangible medium that may contain or store a program for use by or in connection with an instruction execution system, apparatus, or device. The machine-readable medium may be a machine-readable signal medium or a machine-readable storage medium. A machine-readable medium may include but is not limited to an electronic, magnetic, optical, electromagnetic, infrared, or semiconductor system, apparatus, or device, or any suitable combination of the foregoing. More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations are performed in the particular order shown or in sequential order, or that all illustrated operations are performed to achieve the desired results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular implementations. Certain features that are described in the context of separate implementations may also be implemented in combination in a single implementation. Rather, various features described in a single implementation may also be implemented in multiple implementations separately or in any suitable subcombination.

Although the subject matter has been described in language specific to structural features and/or methodological acts, it is to be understood that the subject matter specified in the appended claims is not necessarily limited to the specific features or acts described above. Rather, the specific features and acts described above are disclosed as example forms of implementing the claims.

The invention claimed is:
1. An electronic device, comprising:
   a processing unit; and
   a memory coupled to the processing unit and having instructions stored thereon, the instructions, when executed by the processing unit, causing the device to perform acts of:
   determining, from an image, a target text line area expected to include a text to be recognized;
   determining probability distribution information of at least one character model element present in the target text line area using a single character model, each character model element comprising at least one character or symbol, and the single character model being trained based on a plurality of training text line areas with texts arranged in different orientations and respective ground-truth texts in the plurality of training text line areas; and
   determining the text in the target text line area based on the determined probability distribution information, wherein determining the text in the target text line area comprises:
      generating the text in the target text line area based on the determined probability distribution information and by use of a single language model and a predetermined lexicon,
      wherein the predetermined lexicon at least comprises textual elements in a plurality of predetermined languages, each textual element comprising at least one character model element, and the single language model is used to apply a constraint on a grammatical relationship between the textual elements in the plurality of predetermined languages.

2. The device of claim 1, wherein the respective ground-truth texts in the plurality of training text line areas comprise a plurality of texts related to a plurality of predetermined languages, each of the plurality of texts comprising a single-language text or a mixed-language text.

3. The device of claim 2, wherein the plurality of predetermined languages comprise at least one of the following: at least one Latin language, and at least one Eastern language.

4. The device of claim 1, wherein if the plurality of predetermined languages comprise a Latin language, the predetermined lexicon further comprises at least one textual sub-element determined from a corpus in the Latin language, each textual sub-element comprising a part of a textual element in the Latin language.

5. The device of claim 4, wherein the determining of the at least one textual sub-element comprises byte pair encoding (BPE) performed on the corpus in the Latin language.

6. The device of claim 1, wherein the single language model comprises an n-gram language model.

7. The device of claim 1, wherein determining the text in the target text line area comprises:
   determining the text in the target text line area using a decoding model based on a weighted finite-state transducer (WFST).

8. A computer-implemented method, comprising:
   determining, from an image, a target text line area expected to include a text to be recognized;
   determining probability distribution information of at least one character model element present in the target text line area using a single character model, each character model element comprising at least one character or symbol, and the single character model being trained based on a plurality of training text line areas with texts arranged in different orientations and respective ground-truth texts in the plurality of training text line areas; and
   determining the text in the target text line area based on the determined probability distribution information, wherein determining the text in the target text line area comprises:
      generating the text in the target text line area based on the determined probability distribution information and by use of a single language model and a predetermined lexicon,
      wherein the predetermined lexicon at least comprises textual elements in a plurality of predetermined languages, each textual element comprising at least one character model element, and the single language model is used to apply a constraint on a grammatical relationship between the textual elements in the plurality of predetermined languages.

9. The method of claim 8, wherein the respective ground-truth texts in the plurality of training text line areas comprise a plurality of texts related to a plurality of predetermined languages, each of the plurality of texts comprising a single-language text or a mixed-language text.

10. The method of claim 9, wherein the plurality of predetermined languages comprise at least one of the following: at least one Latin language, and at least one Eastern language.

11. The method of claim 8, wherein if the plurality of predetermined languages comprise a Latin language, the predetermined lexicon further comprises at least one textual sub-element determined from a corpus in the Latin language, each textual sub-element comprising a part of a textual element in the Latin language.

12. A computer program product being tangibly stored in a computer storage medium and comprising machine-executable instructions, the machine-executable instructions, when executed by a device, causing the device to:

determine, from an image, a target text line area expected to include a text to be recognized;

determine probability distribution information of at least one character model element present in the target text line area using a single character model, each character model element comprising at least one character or symbol, and the single character model being trained based on a plurality of training text line areas with texts arranged in different orientations and respective ground-truth texts in the plurality of training text line areas; and determine the text in the target text line area based on the determined probability distribution information, wherein determining the text in the target text line area comprises:

generating the text in the target text line area based on the determined probability distribution information and by use of a single language model and a predetermined lexicon, wherein the predetermined lexicon at least comprises textual elements in a plurality of predetermined languages, each textual element comprising at least one character model element, and the single language model is used to apply a constraint on a grammatical relationship between the textual elements in the plurality of predetermined languages.

13. The computer program product of claim 12, wherein if the plurality of predetermined languages comprise a Latin language, the predetermined lexicon further comprises at least one textual sub-element determined from a corpus in the Latin language, each textual sub-element comprising a part of a textual element in the Latin language.

14. The computer program product of claim 13, wherein the determining of the at least one textual sub-element comprises byte pair encoding (BPE) performed on the corpus in the Latin language.

15. The computer program product of claim 12, wherein the single language model comprises an n-gram language model.

16. An electronic device, comprising:

a processing unit; and a memory coupled to the processing unit and having instructions stored thereon, the instructions, when executed by the processing unit, causing the device to perform acts of:

determining, from an image, a target text line area expected to include a text to be recognized;

determining probability distribution information of at least one character model element present in the target text line area using a single character model, without determining an orientation and a language of the text in the target text line area, each character model element comprising at least one character or symbol, and the single character model being trained based on a plurality of training text line areas with texts arranged in different orientations and respective ground-truth texts in the plurality of training text line areas, the ground-truth texts comprising at least texts related to a Latin language and an Eastern language; and determining the text in the target text line area based on the determined probability distribution information, wherein determining the text in the target text line area comprises:

generating the text in the target text line area based on the determined probability distribution information and by use of a single language model and a predetermined lexicon, wherein the predetermined lexicon at least comprises textual elements in a plurality of predetermined languages, each textual element comprising at least one character model element, and the single language model is used to apply a constraint on a grammatical relationship between the textual elements in the plurality of predetermined languages.

17. The electronic device of claim 16, wherein if the plurality of predetermined languages comprise a Latin language, the predetermined lexicon further comprises at least one textual sub-element determined from a corpus in the Latin language, each textual sub-element comprising a part of a textual element in the Latin language.

18. The electronic device of claim 17, wherein the determining of the at least one textual sub-element comprises byte pair encoding (BPE) performed on the corpus in the Latin language.

19. The electronic device of claim 16, wherein the single language model comprises an n-gram language model.

* * * * *